United States Patent [19]

Pham

[11] Patent Number: 5,250,508
[45] Date of Patent: Oct. 5, 1993

[54] SUPERCONDUCTOR CURRENT-LIMITING APPARATUS

[75] Inventor: Van Doan Pham, Meyzieu, France

[73] Assignee: GEC Alsthom SA, Paris, France

[21] Appl. No.: 760,315

[22] Filed: Sep. 16, 1991

[30] Foreign Application Priority Data

Sep. 14, 1990 [FR]  France ................. 90 11383

[51] Int. Cl.$^5$ ............................................. H02H 9/02
[52] U.S. Cl. ................................ 505/1; 505/850; 505/881; 361/19; 361/58; 323/360
[58] Field of Search ................ 361/19, 141, 58; 323/360; 505/850, 881

[56] References Cited

U.S. PATENT DOCUMENTS

| | | | |
|---|---|---|---|
| 3,617,807 | 11/1971 | Kesselring . | |
| 3,629,690 | 12/1971 | Massar | 361/19 |
| 3,703,664 | 11/1972 | Cronin | 361/19 |
| 3,736,439 | 5/1973 | Kesselring . | |
| 4,336,561 | 6/1982 | Murphy | 361/19 |
| 5,140,290 | 8/1992 | Dersch | 361/19 |

FOREIGN PATENT DOCUMENTS 0228584  7/1987  European Pat. Off. .
1926972  11/1970  Fed. Rep. of Germany .

*Primary Examiner*—Todd E. DeBoer
*Attorney, Agent, or Firm*—Sughrue, Mion, Zinn, Macpeak & Seas

[57] ABSTRACT

The invention relates to superconductor current-limiting apparatus of the type having a magnetic core around which firstly a superconductor component is disposed, followed by an electric coil made of non-superconducting material, the apparatus being designed to be inserted in a line to be protected (L), the assembly constituted by the magnetic core (6A, 6B), the superconductor component (3A, 3B) and the electric coil (2A, 2B) forming a current-limiting unit which is connected in the line to be protected in series with a circuit-breaker. The apparatus has two current-limiting units contained in a single tank (13) filled with a dielectric cooling fluid (17), each superconductor component being disposed in an insulating cryostat (4A, 4B) filled with a cryogenic fluid, each magnetic core being part of a closed magnetic circuit, the tank having electrical bushings (14, 15, 16) for connecting the electric coils to the line to be protected via circuit-breakers (30A, 30B), the limiting units being assembled in parallel.

5 Claims, 2 Drawing Sheets

SUPERCONDUCTOR CURRENT-LIMITING APPARATUS

The present invention relates to superconductor current-limiting apparatus usable in particular in high or medium tension electric power transport and distribution installations.

Superconductor current-limiters use the transition phenomenon, i.e. the sudden change from the superconducting state to the resistive state when a fault current exceeds the critical current of a superconducting wire. Protection is provided in a very short time (less than a millisecond) by limiting the fault current to a predetermined value without requiring a protection system.

One known limiter is constituted by a superconducting coil without a magnetic circuit and having very low inductance, which coil is housed inside a cryostat filled with liquid helium. The limiter may be installed in sets of high short-circuit current bus bars or on a high current line. A circuit-breaker of low interrupting power connected in series with the limiter enables the circuit to be isolated. Under normal operating conditions, the voltage drop at the terminals of the limiter due to self-inductance is very low, and therefore has no influence on the operation of the electrical circuit. When a fault appears, the current in the limiter rises very quickly to the critical current, for which the superconducting coil may have a resistance of several hundred ohms. The circuit-breaker, placed in series with the coil, isolates it very quickly (after about 10 ms) from the circuit. Under these conditions, the coil returns to its superconducting state after a few seconds.

A perfect conductor, such as a superconductor, cannot see any fluctuation in magnetic flux. It therefore expels magnetic field lines coming in from the outside. This is known as the Meissner effect. A current-limiter may therefore be designed so that it includes a magnetic core which is covered with a superconducting material and around which a coil made of non-superconducting material is disposed, the entire assembly being placed in a cryostat. The coil is connected in series in the line to be protected. In normal operation, the superconductor expels the magnetic field lines which are generated by the coil and which cannot therefore be closed via the magnetic core. In this way, despite the presence of a magnetic core, the coil behaves virtually like an inductor in air. It therefore has a fairly low self-inductance.

In the event of a short-circuit, the current passing through the coil increases and, consequently, the magnetic field generated inside the coil also increases to exceed the critical magnetic field of the superconductor which changes state and loses its superconductivity. The magnetic field lines created by the coil can then penetrate the magnetic core. The inductance of the primary coil increases very quickly and limits the short-circuit current effectively. A tenfold increase in the inductance of the coil is more than enough to be effective. Once transition has occurred, a relatively long time (longer than several seconds) is required for the material to recover its superconductivity.

The two above-described limiters do not enable the following sequence of circuit-breaker operations to be achieved:

O—t—CO in which:

O represents an opening operation;
t is equal to 0.3 seconds; and
CO represents a closing operation immediately followed by an opening operation.

Those limiters require several seconds before the superconducting material recovers its pre-transition state, while, paradoxically, they require less than one millisecond to limit a fault current.

Superconductor current limiters are, however, very attractive because of their speed of operation in the event of a short-circuit, while they are also capable of transporting a high nominal current at high voltage.

Implementing them is subject to problems of manufacturing cost, compactness, economy, and ease of maintenance.

The present invention is designed to mitigate the drawback constituted by the excessive length of time required for re-closing the circuit (several seconds), which drawback is characteristic of superconductor current limiters. The invention is also designed so that manufacturing cost is as low as possible, and so that the apparatus is compact, economical, and easy to maintain.

The problem posed by the requirement of a short re-closing time was solved by using two magnetic circuit and superconductor current-limiting units (for greater effectiveness).

By disposing the two limiting units in a single tank, current-limiting costs are reduced and the apparatus is more compact.

Apparatus of the invention is also economical because the cryogenic fluid serving to cool the superconductor components is placed in cryostats which contain these components only, and are therefore small in volume. These small volume cryostats also help make the apparatus more compact.

Maintenance of the apparatus is facilitated by the fact that cryogenic fluid leaks are reduced. Under no circumstances are the superconductors electrically connected to an electric circuit outside the cryostats.

The invention therefore provides superconductor current-limiting apparatus of the type having a magnetic core around which firstly a superconductor component is disposed, followed by an electric coil made of non-superconducting material, the apparatus being designed to be inserted in a line to be protected, the assembly constituted by the magnetic core, the superconductor component and the electric coil forming a current-limiting unit which is connected in the line to be protected in series with a circuit-breaker, the apparatus being characterized in that it has two current-limiting units contained in a single tank filled with a dielectric cooling fluid, each superconductor component being disposed in an insulating cryostat filled with a cryogenic fluid, each magnetic core being part of a closed magnetic circuit, the tank having electrical bushings for connecting the electric coils to the line to be protected via circuit-breakers, the limiting units being assembled in parallel.

In a preferred embodiment, the magnetic circuit is a three-column circuit, said magnetic cores being constituted by the end columns.

In a variant embodiment, each magnetic core is part of a closed magnetic circuit having two branches, one of the branches serving for magnetic flux return, the magnetic circuits of the two current-limiting units being disposed side-by-side, the flux return branches facing each other and being separated by a narrow gap.

The narrow gap may be constituted by a sheet of insulating material.

Advantageously, each electric coil may be disposed in an annular insulating enclosure in which a dielectric cooling fluid circulates.

BRIEF DESCRIPTION OF THE DRAWINGS

The invention will be better understood and other advantages will appear on reading the following non-limiting description given with reference to the accompanying drawings, in which:

FIG. 1 shows current-limiting apparatus of the invention inserted in a line L to be protected. The apparatus includes a magnetic circuit 1 having three columns standing via spacers (not shown) on the bottom of a metal tank 13 connected to ground. The end columns or end branches 6A and 6B form the magnetic cores around which the current-limiters are constituted. In this embodiment, the superconductor components 3A and 3B are constituted by closed loop coils made of superconducting material and wound around the branches 6A and 6B respectively. The electric coil 2A, e.g. made of copper, is disposed coaxially around the superconductor component 3A. The same goes for the electric coil 2B relative to the superconductor component 3B. The electric coils 2A and 2B are made of wires of sufficient section to carry the nominal current.

Figure 1:
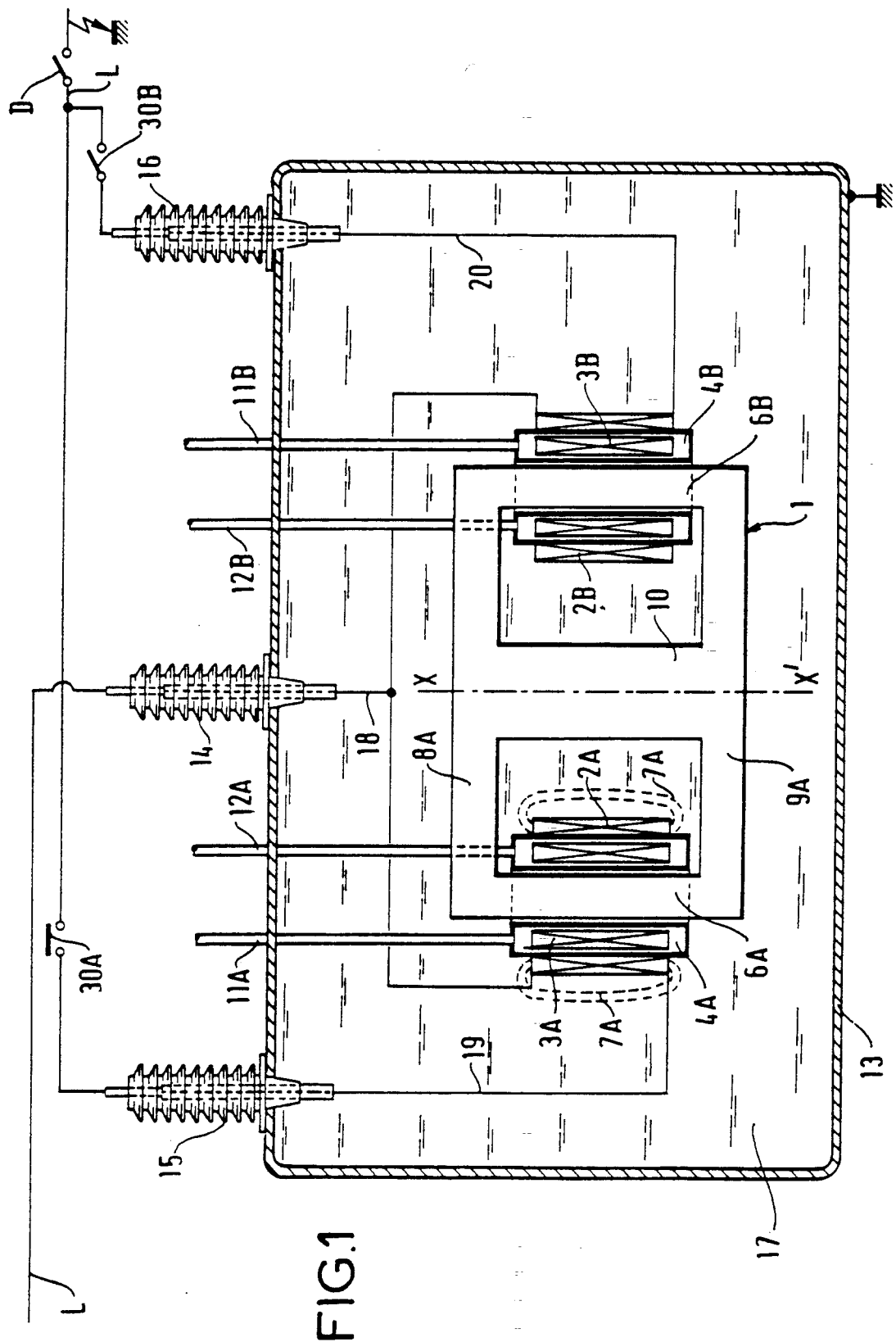
FIG. 1 is a section view through superconductor current-limiting apparatus of the invention.

The superconductor components 3A and 3B are placed in annular cryostats respectively referenced 4A and 4B. These cryostats are made mainly of insulating material and are filled with a cryogenic fluid. Insulating ducts 11A and 12A, or 11B and 12B serve for filling the cryostats with the cryogenic fluid and for removing gas.

The metal tank 13 is filled with a dielectric cooling fluid 17 which may be oil, sulfur hexafluoride $SF_6$ or compressed air.

Three electrical bushings 14, 15 and 16 are provided to connect connections 18, 19 and 20 to the line L. The ducts 11A and 12A, 11B and 12B project from the tank 13 via bushings which are not shown.

In normal operation, coil 2A, for example, is inserted in the line L to be protected, via the circuit-breaker 30A which is then in the closed position as is the circuit-breaker D. Since the circuit-breaker 30B is in the open position, coil 2B is taken out of the circuit.

Under these conditions, the line current passes through coil 2A. The magnetic field lines generated by the coil are expelled from the branch 6A of the magnetic circuit and are looped mainly in the surrounding fluid in the space 7A and to a very small extent in the top branch 8A, in the central branch 10 and in the bottom branch 9A of the magnetic circuit 1.

Preferably, the superconductor components are about 20% taller than the electric coils so as to provide proper repelling of the magnetic field lines out of the magnetic circuit.

Since the electric coil 2A is not subject to the influence of a magnetic core, it has low impedance for the line L.

In the event of a fault in the line, the current passing through the electric coil increases as does the magnetic field generated. When the critical magnetic field is reached, the superconductor 3A changes state. The magnetic field lines can then enter branch 6A and loop via branches 8A, 10 and 9A. There is virtually no magnetic flux in branch 6B. By choosing a section for branch 10 that is larger (about twice as large) than the section of each of branches 6A and 6B, very low reluctance is obtained in branch 10.

After the superconductor component 3A has changed state, the circuit-breaker 30A and the line circuit-breaker D are opened in a time of 40 milliseconds, for example, and then the circuit-breaker 30B and the circuit breaker D are closed to switch coil 2B into circuit while waiting for the component 3A to recover its superconductivity state.

The superconductor components may be formed by windings of superconducting wires made of NbTi and tightly wound around an insulating tube. They may also be formed by high critical temperature ceramic rings, e.g. of the YBaCuO type, superposed around an insulating tube and thereby forming a superconducting screen against the magnetic field lines of the electric coils. In the first tank, the cryogenic fluid is liquid helium. In the second tank, it could be liquid nitrogen.

Instead of a three-column magnetic circuit, it is possible to use two identical magnetic circuits each having two columns or branches, one column serving as a magnetic core for a limiter, and the other column serving to loop the magnetic flux. This is the same as splitting the FIG. 1 magnetic circuit in two along the axis XX'. For the purposes of compactness, the two magnetic circuits may be disposed side-by-side, the return legs facing each other and separated by a narrow gap (about a few millimeters wide). This gap may also be constituted by a sheet of insulating material. In this way magnetic leaks from one circuit to the other are virtually eliminated.

Figure 2:
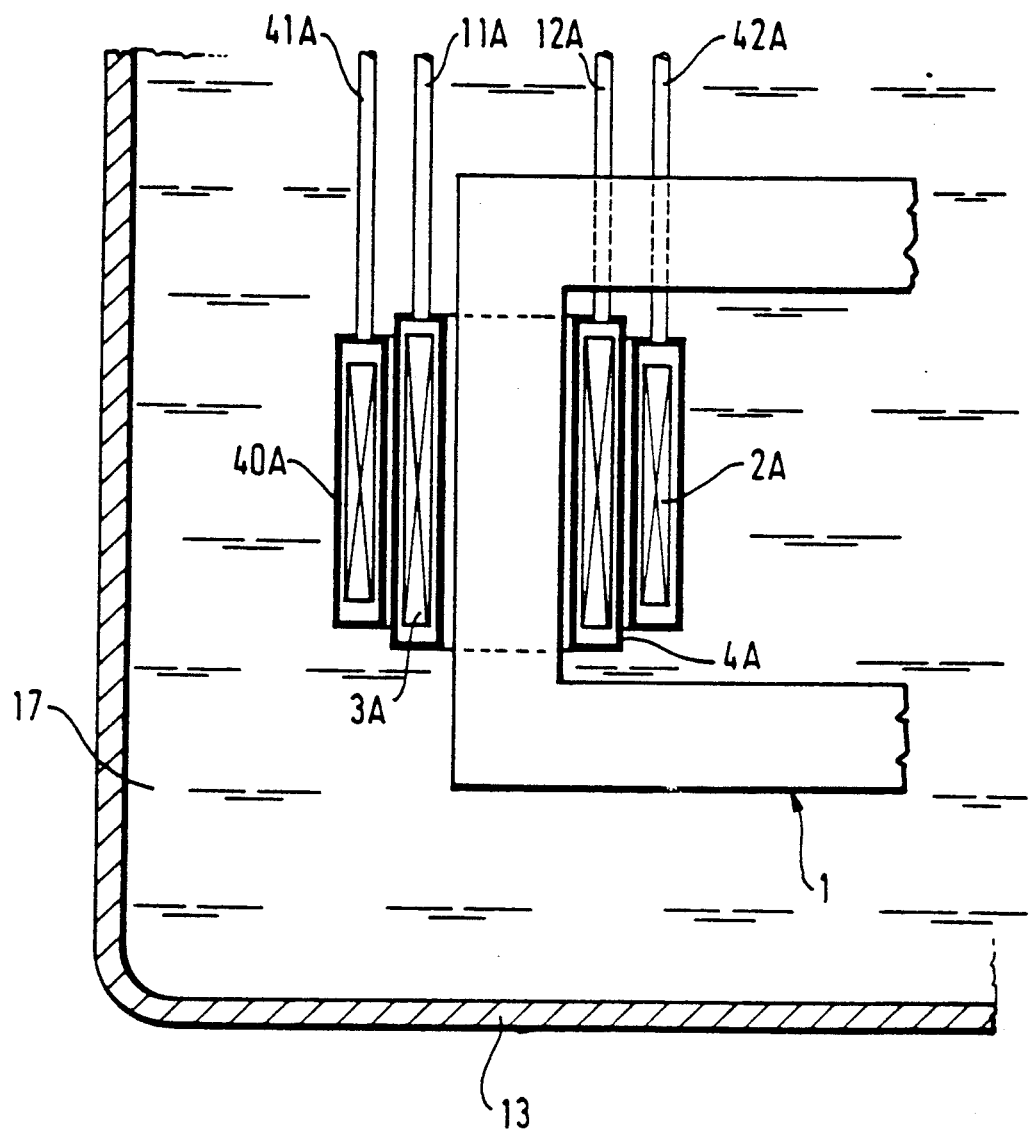
FIG. 2 shows a detail of a variant current-limiting apparatus of the invention.

It may be advantageous, as shown in FIG. 2, to enclose the electric coils in annular insulating enclosures cooled by circulation of a dielectric cooling fluid which may be of the same kind as the fluid filling the tank. Therefore, around the magnetic cores, the apparatus has a second annular enclosure such as the enclosure referenced 40A, the fluid circulating via ducts 41A and 42A. By circulating the cooling fluid, the heat given off by the electric coil is quickly removed to the outside, so as to avoid heating the fluid 17 in the tank 13.

I claim:

1. Superconductor current-limiting apparatus to be inserted in a line to be protected (L) and comprising two current-limiting units, each unit being constituted by a magnetic core (6A, 6B), a superconductor component (3A, 3B) and an electric coil (2A, 2B) disposed around said magnetic core, said two current-limiting units being contained in a single tank (13) filled with a dielectric cooling fluid (17), each superconductor component being disposed in an insulating cryostat (4A, 4B) filled with a cryogenic fluid, each magnetic core being part of a closed magnetic circuit, the tank having electrical bushings (14, 15, 16) and means including a circuit-breaker (D) for selectively connecting the electric coils (2A, 2B) in series with the line (L) to be protected via respective circuit-breakers (30A, 30B) in parallel; and wherein in normal operation one of said coils (2A) is inserted in the line (L) via circuit-breaker (30A) upon closure of circuit-breaker (D) with circuit-breaker (30B) open and electric coil (2B) out of the circuit such that in event of a fault in the line (L) current increase in the electric coil (2A) causes superconductor (3A) to change state, and wherein opening of line circuit-breaker (30A) and line circuit-breaker (D) are effected in a significantly short time of 40 milliseconds thereby permitting near instantaneous closure of circuit-breaker (30B) and circuit-breaker (D) to switch coil (2B) into the circuit while waiting for superconductor (3A) to recover its superconductivity state, thereby significantly reducing the time required for re-closing of the circuit.

2. Apparatus according to claim 1, wherein the magnetic circuit is a three-column circuit (1), and said magnetic cores are constituted by respective end columns (6A, 6B) of the magnetic circuit.

3. Apparatus according to claim 1, wherein each magnetic core is part of a closed magnetic circuit having two branches, one of the ranches serving for magnetic flux return, the magnetic circuits of the two current-limiting units being disposed side-by-side, the flux return branches facing each other and being separated by a narrow gap.

4. Apparatus according to claim 3, wherein the gap is constituted by a sheet of insulating material.

5. Apparatus according to claim 1 wherein each electric coil (2A) is disposed in annular insulating enclosure (40A) in which a dielectric cooling fluid circulates.

* * * * *